INVENTORS.
WILLIAM F. GUNNING
R. GLEN MADSEN
BY White & Haefliger
ATTORNEYS.

Jan. 6, 1970 W. F. GUNNING ET AL 3,488,452

RECORD SPEED COMPENSATION FOR SYSTEMS FOR PROCESSING RECORDER INFORMATION

Filed May 24, 1965 3 Sheets-Sheet 2

INVENTORS.
WILLIAM F. GUNNING
R. GLEN MADSEN
By White & Haefliger
ATTORNEYS.

INVENTORS.
WILLIAM F. GUNNING
R GLEN MADSEN
By White & Haefliger
ATTORNEYS.

United States Patent Office 3,488,452
Patented Jan. 6, 1970

3,488,452

RECORD SPEED COMPENSATION FOR SYSTEMS FOR PROCESSING RECORDED INFORMATION

William F. Gunning, Fullerton, and R. Glen Madsen, Newport Beach, Calif., assignors to Astrodata, Inc., Anaheim, Calif., a corporation of California Filed May 24, 1965, Ser. No. 458,209
Int. Cl. G11b *5/00*
U.S. Cl. 179—100.2 14 Claims

ABSTRACT OF THE DISCLOSURE

The disclosure concerns frequency domain tape speed compensation wherein overall stability for a given channel is related to the stability of the data discriminator alone, as compared with conventional systems wherein the overall stability is related to the sum of the stabilities of both the data discriminator and the reference frequency discriminator.

This invention relates generally to the processing of time or frequency modulated signals, and more particularly concerns improvements in systems providing compensation for errors in playback speed of a recording from which the FM data input signal is derived.

Frequency multiplexed FM instrumentation systems employ a recording, as for example magnetic tape, on which a multiplex of frequency modulated sub-carrier signals are recorded along with a reference frequency signal. Upon playback of the tape, the sub-carrier signals are separated by band pass filters and applied to FM sub-carrier discriminators to derive signals representing the data in variable voltage form. In certain systems of this type, for example as disclosed in U.S. Patent 3,017,616 to Runyan, a reference frequency is converted to a voltage and applied to a data discriminator in biasing relation in order to compensate for record playback speed error; however, unwanted errors and other disadvantages arise and are associated with such prior systems where reference frequency to error voltage conversion is employed. Such prior systems may be characterized as employing analog domain tape speed compensation.

It is a major object of the present invention to eliminate the above-mentioned and other disadvantages of prior record speed variation compensation methods and systems, through the provision of a novel and unusual system wherein a version of the reference frequency is directly employed to obtain compensation, the present system characterized as employing frequency domain tape speed compensation. As a result, the overall stability for a given data channel is that of the data discriminator alone, whereas in conventional systems the overall stability is the sum of the stabilities of both the data discriminator and the reference frequency discriminator.

In a system employing the present invention, a frequency modulated data input signal $f_d$ is recorded, as for example on magnetic tape, along with a reference frequency signal $f_r$. During playback, frequencies $f_d$, $f_r$ and versions $f_s$ and $f_x$ vary proportionally with tape speed variations; further the system incorporates data discriminator means responsive to the $f_d$ and $f_x$ signals to derive an internal or feedback signal of frequency $f_v$ tracking $f_d$ and an output voltage that varies as a function of the ratio $f_v/f_x$. As a result, the discriminator output voltage is not affected by tape speed changes, up to the limit that the data and reference frequency delays can be matched, since such changes merely increase or decrease each of $f_v$ and $f_r$ by the same proportion, which cancel in the ratio $f_v/f_x$.

Another important object of the invention is to provide means responsive to the recorded reference signal of frequency $f_r$ to supply a version thereof of frequency $f_s$ to the data discriminator. Such a means typically includes a band pass filter and a phase locked loop respectively characterized as providing time delays $\tau_1$ and $\tau_2$ for the reference signol version of frequency $f_s$; further, the data discriminator includes a band pass filter characterized as providing a time delay $\tau_4$ for the data input signal of frequency $f_d$, and in certain circumstances the sum of $\tau_1$ and $\tau_2$ is substantially equal to $\tau_4$.

Under certain other circumstances, as will appear, it is important to provide an additional time delay $\tau_5$ for the reference frequency version being supplied to the data discriminator, such additional time delay being supplied by an auxiliary phase locked loop in the data discriminator. In this event, the data signal $f_d$ is given delay $\tau_5$ by an external delay line such that $\tau_3$ equals $\tau_1$ plus $\tau_2$, and $\tau_5$ equals $\tau_4$. Another function of the auxiliary phase locked loop is to convert the reference signal version of frequency $f_s$ to an appropriate clocks signal of frequency $f_x$ supplied to the current controlled oscillator (ICO) in the main phase locked loop of the data discriminator.

These and other objects and advantages of the invention, as well as the details of illustrative embodiments, will be more fully understood from the following detailed description of the drawings in which.

Figure 1:
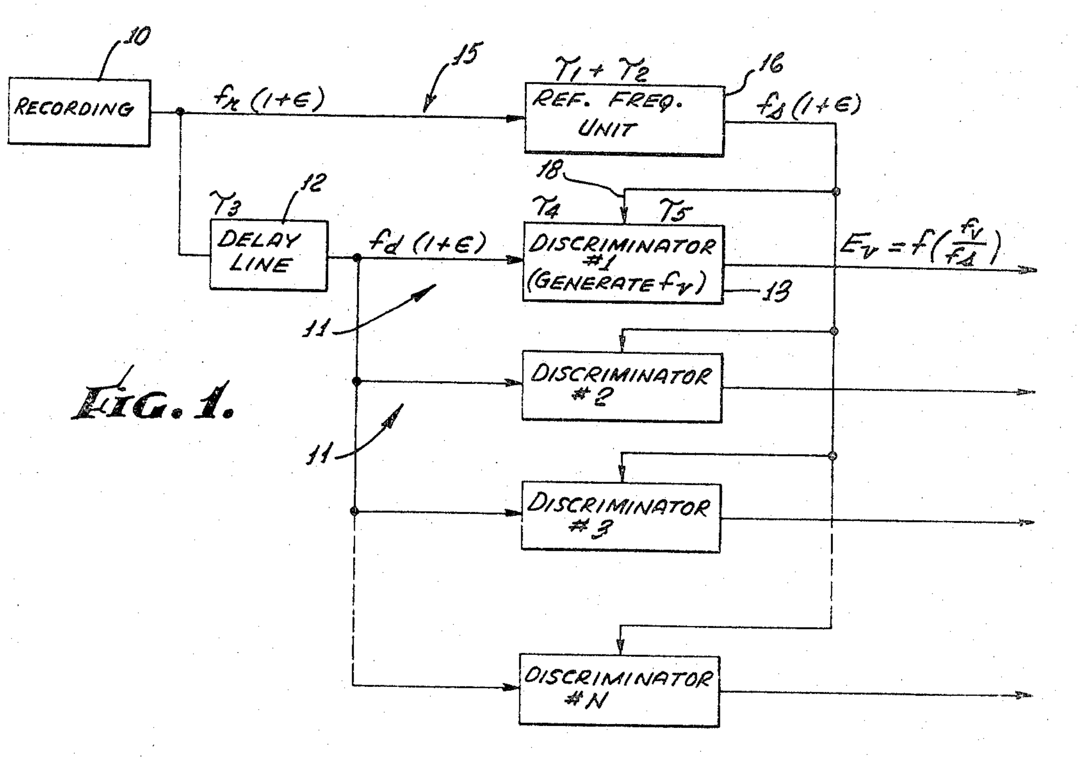
FIG. 1 is a block diagram showing a data handling system embodying the invention.

Referring first to FIG. 1, the system for handling recorded information comprises a magnetic tape playback device 10 such as a drive and a transducer operable to translate film or tape signals recorded on magnetic tape into time varying electrical signals, the latter typically include frequency modulated sub-carrier signals as well as a reference frequency signal. The reference frequency is preferably but not necessarily recorded on the same track with the FM data multiplex, i.e. the reference frequency $f_r$ may be recorded on a track different from the data multiplex.

The FIG. 1 system includes data discriminator channels 11 corresponding to the number of sub-carrier signals to be handled at one time, the channels being connected in parallel and to the output of playback device 10 through a suitable delay line 12. Each discriminator channel includes a data discriminator 13 typically incorporating a band pass filter 14, better seen in FIG. 2, for rejecting signals having a frequency outside the channel pass band. The diagrams show the data signal of frequency $f_d$ applied to a typical data discriminator 13, this signal falling within the band passed by the filter. As will apepar, the data signal of frequency $f_d$ is time delayed in the conventional delay line 12 by an amount $\tau_3$, and is also time delayed in the conventional band pass filter 14 by an amount $\tau_4$.

The FIG. 1 system also includes a reference frequency channel 15 in which the reference signal of frequency $f_r$ obtained from the recording 10 is processed, as by unit 16. In the latter the reference frequency $f_r$ is separated from the FM multiplex by a band pass filter 17 having an envelope delay $\tau_1$. The reference frequency signal $f_r$ is then converted in unit 16 to a new frequency $f_s$, i.e. a frequency version of the reference frequency which is suitable for application to the wow and flutter input at 18 of the data discriminator 13. The conversion process is typically implemented by passage of the reference frequency $f_r$ through limiter 20 seen in FIG. 2 and application to a phase locked loop 21 connected with suitable frequency dividers 22 and 23 arranged so that the reference frequency version $f_s$ is proportional to $f_r$, and typically equals $$\frac{m}{n}f_r$$

where $m$ and $n$ represent the division factors in the dividers 22 and 23.

Loop 21 typically includes a phase detector 24, loop filter 25 to control the response of the loop, including phase and gain, and a conventional voltage controlled oscillator 26 connected as shown. The VCO output frequency is divided by a factor $m$ at 22 and applied to detector 24. In the frequency conversion process the reference frequency is delayed by an additional time $\tau_2$ determined by the design of the loop 21 so that reference frequency version $f_s$ is delayed by the total amount $\tau_1+\tau_2$.

Referring again to the data discriminator 13, it is responsive to the $f_d$ and $f_s$ input signals to derive an internal or feedback signal of frequency $f_v$ tracking $f_d$ ,and also to derive an output voltage that varies as a function of the ratio $f_v/f_x$, as will be seen. As a result, the discriminator phase locked loop output voltage $E_v$ is not affected by tape speed changes, since such changes merely increase or decrease each of $f_v$ and $f_d$ by the same proportion, which cancel in the ratio $$\frac{f_v(1+\epsilon)}{f_d(1+\epsilon)}=\frac{f_v}{f_d}$$

More specifically, the data discriminator 13 typically includes a main phase locked loop 27 responsive to the input data signal of frequency $f_d$ that has passed through band pass filter 14, limiter 14*a*, and an auxiliary phase locked loop 28 to which the above described version of the reference frequency signal of frequency $f_s$ is supplied at 18. Auxiliary loop 28 typically converts the version $f_s$ to a clock signal of frequency $f_x$ suitable for application to the main loop 27. In addition, the auxiliary loop 28 provides a time delay $\tau_5$ for the clock signal $f_x$ to match the delay $\tau_4$ of the data signal $f_d$. Elements of the loop 28, include the phase detector 30, loop filter 31 to control the response of the loop, and a conventional voltage controlled oscillator or VCO 32, and divider 33 to divider the VCO output frequency $f_x$ for application to the detector 30. The arrangement is such that the clock frequency version $f_x$ at the output of the VCO 32 is proportional to $f_s$ and to $f_r$, and typically equals $$\frac{mp}{n}f_r$$

where $m$ and $n$ again represents the division factors in dividers 22 and 23 and $p$ represents the division factor in the divider 33.

The phase delays $\tau_1$ through $\tau_5$ discussed above are typically interrelated in such manner that the data signal of frequency $f_d$ and the clock signal of frequency $f_x$ are time correlated at the respective inputs 35 and 36 of the main loop 27 of the data discriminator. The interrelation of the delays may be grouped as follows, according to different design circumstances, the objective in each case being to provide means for delaying $f_x$ by an amount to match the delay encountered by $f_d$,

CASE 1

$$\tau_1+\tau_2=\tau_3 \quad (1)$$
$$\tau_4=\tau_5 \quad (2)$$
$$\tau_1+\tau_2+\tau_5=\tau_3+\tau_4 \quad (3)$$

CASE 2

$$\tau_1+\tau_2=\tau_3+\tau_4 \quad (4)$$
$$\tau_5=0 \quad (5)$$
$$f_s=f_x \quad (5a)$$

CASE 3

$$\tau_1+\tau_2=\tau_4 \quad (6)$$
$$\tau_3=0 \quad (7)$$
$$\tau_5=0 \quad (8)$$
$$f_s=f_x \quad (8a)$$

Referring now to the main loop 27, it typically includes a phase detector 38 and loop filter 39 which may have conventional design, and a current controlled oscillator 40 as described in Stanley C. Forrest, Jr. et al. application, "Voltage Controlled Oscillator," Ser. No. 424,558. Such an oscillator is shown in the loop 27*a* of FIG. 3 herein to include a charge storage capacitor 41, a summing junction 42 connected at 43 with the capacitor 41, a first unidirectional current flow leg indicated generally at 44 and connected to junction 42 to provide a path for charge current $I_r$, a second unidirectional current flow leg 45 and connected to junction 42 to provide a path for discharge current $I_c$, and a third leg or lead indicated at 27 and connected to junction 42 to provide a path for variable current $I_v$ obtained from the loop filter. Network leg 44 is shown to include an appropriate resistor 49 and diode 50, suitable positive and negative voltage sources 51 and 52 being connected to the respective legs 44 and 45.

The sum of the currents at junction 42 is represented by the expressions $(I_v-I_c)$ or $(I_v-I_c+I_r)$ depending upon whether a switching device 53 for $I_r$ is set or reset. Device 53, which is connected to leg 44 via diode 54, functions to periodically shunt or interrupt flow of $I_r$ current to junction 42 over timewise spaced intervals, the latter being established as a result of the $f_x$ clock pulse input to device 53 operating in conjunction with trigger pulse inputs at 55 from a comparator 56, as described in detail in said Forrest et al. application. Suffice it to say herein that the comparator output signal of frequency $f_v$ is defined by the following equation:

$$f_v=k\frac{I_c-I_v}{I_r}f_x \quad (9)$$

where $k$ is a constant. Typically, $I_c$ is always greater than $I_v$, and $I_r$ is always greater than $I_c$, so that the frequency $f_v$ of the internally generated signal fed at 56 to the phase detector 38 is always less than the clock signal frequency $f_x$. Also, $f_v$ is always proportional to $f_x$, and also to $f_s$, for record speed compensation, as further described below.

Equation 9 may be rewritten as follows:

$$I_v=I_c-\frac{I_r f_v}{k f_x} \quad (10)$$

Figure 3:
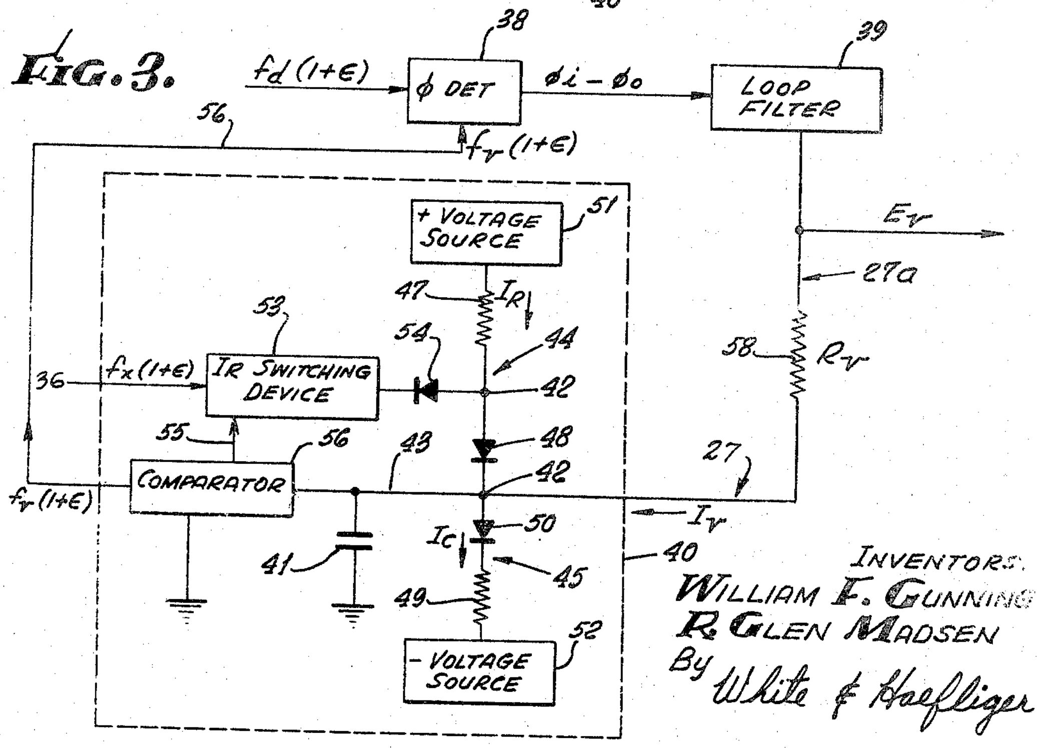
FIG. 3 illustrates the use of a current controlled oscillator in the main phase locked loop of the data discriminator.

In FIG. 3, $I_v$ is seen as derived from the output voltage $E_v$ impressed on resistor 58 of resistance $R_v$, so that Equation 10 may be written:

$$E_v=R_v\left(I_c-I_r\frac{1}{k}\frac{f_v}{f_x}\right) \quad (11a)$$

Moreover, since $f_v$ is directly proportional to $f_d$ (say $f_v=f_d$) we can rewrite 11*a* as:

$$E_v=R_v\left(I_c-I_r\frac{\beta}{k}\frac{f_d}{f_x}\right) \quad (11b)$$

Now, inasmuch as $f_x$ is proportional to $f_s$, the following equation may be written from what has been stated previously:

$$f_x=\frac{mp}{n}f_r \quad (12)$$

With tape or record speed variation, Equation 12 may be rewritten as follows:

$$f_x(1+\epsilon)=\frac{mp}{n}f_r(1+\epsilon) \quad (13)$$

where $\epsilon$ is the variable wow and flutter fractional increase or decrease in tape or record speed. Further, Equation 11*a* may then be written as follows:

$$E_v=R_v\left[I_c-I_r\frac{1}{k}\frac{f_v(1+\epsilon)}{f_x(1+\epsilon)}\right] \quad (14)$$

Notice that since the $(1+\epsilon)$ factors cancel out, Equations 11*a* and 11*b* arise immediately from (14) and perfect tape speed compensation is achieved.

In frequency domain tape speed compensation, $f_v$ is controlled by $f_r$ so that with wow and flutter, $$\frac{f_v(1+\epsilon)}{f_d(1+\epsilon)}=\text{constant} \quad (15)$$

The "error" output of the phase detector 38 may be expressed as $$\phi_i-\phi_o=0 \quad (16)$$

where $\phi_i$ and $\phi_o$ are the respective phase angles of the signals of frequency $f_v$ and $f_d$ constituting the inputs to the phase detector.

Accordingly, it is seen that the quantities $(1+\epsilon)$ cancel in Equation 14; that perfect wow and flutter compensation result for any fixed frequency in the subcarrier band from lower bandedge to upper bandedge; that $I_v$ and $E_v$ remain constant; and that $E_v$ may vary as a function of the ratio $f_v/f_x$, where $$f_x=\frac{mp}{n}f_r$$

Figure 2:
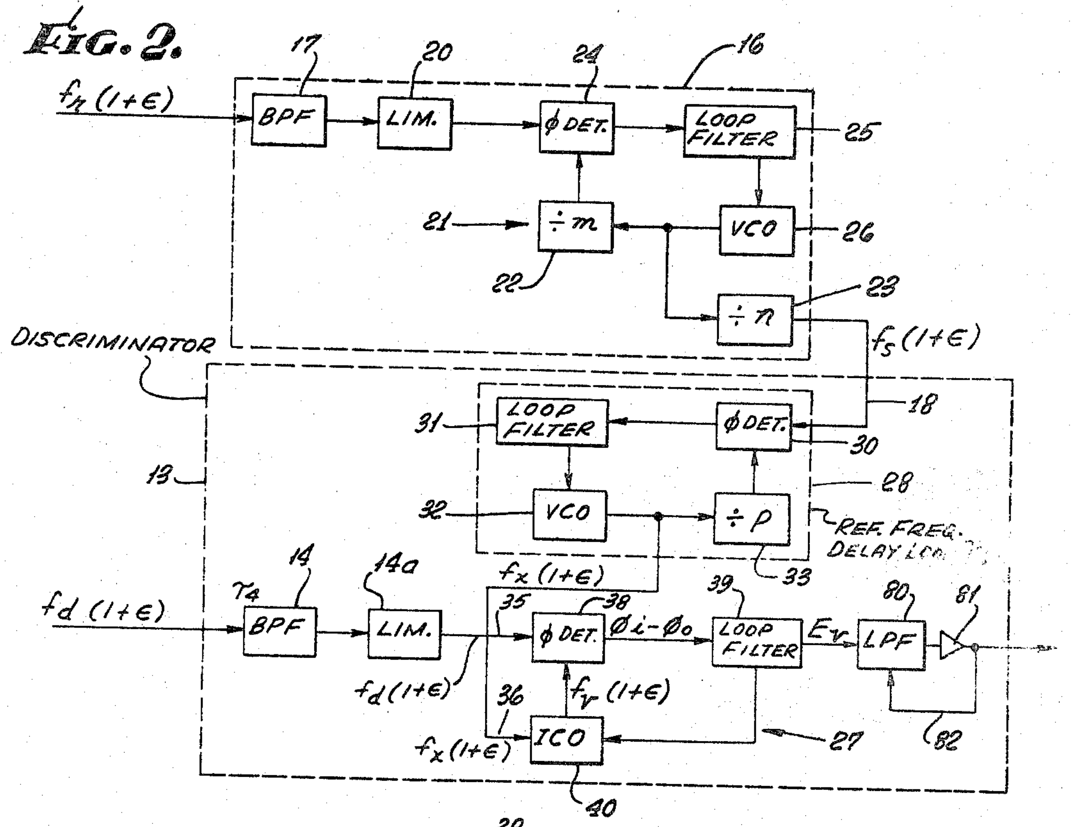
FIG. 2 is a block diagram showing a data discriminator usable in the FIG. 1 data handling system.

Finally, the output voltage $E_v$ from loop 27 is typically applied to low pass output filter 80 and amplifier 81, with feedback at 82, as seen in FIG. 2.

Figure 4:
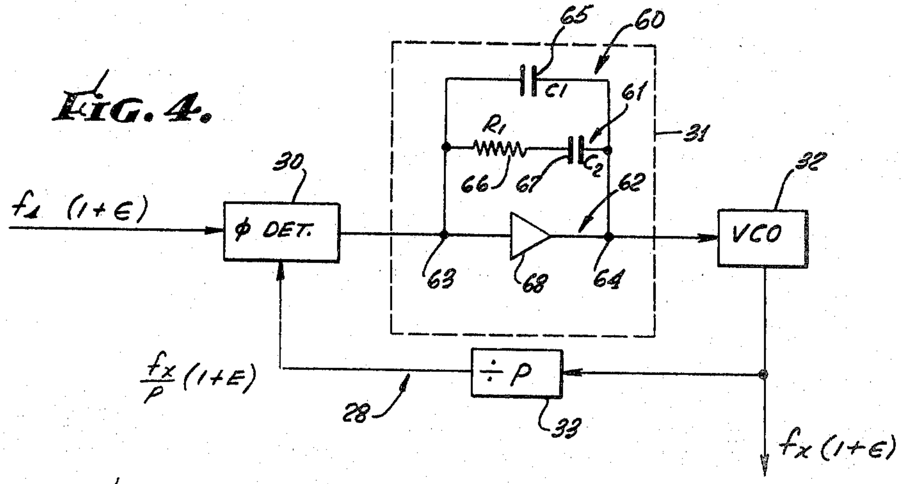
FIG. 4 is a more detailed showing of the auxiliary or reference frequency delay loop of the data discriminator.
Figure 5:
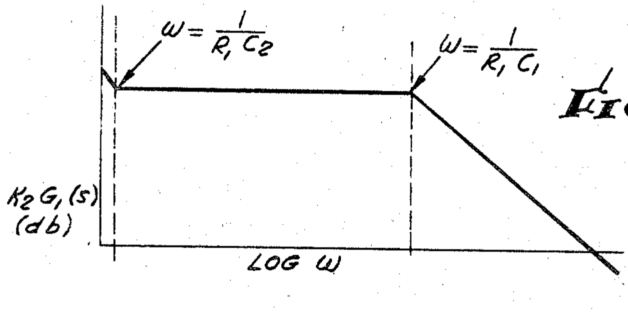
FIG. 5 is Bode diagram of the auxiliary loop filter.
Figure 6:
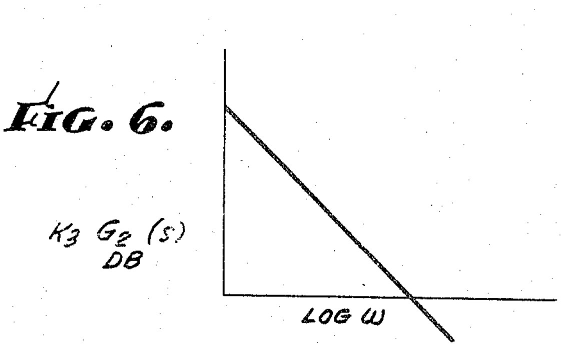
FIG. 6 is a Bode diagram of the VCO response in the auxiliary loop.
Figure 7:
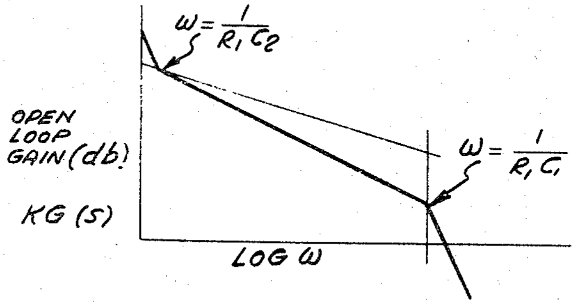
FIG. 7 is a Bode diagram of the complete open loop transfer function, as respects the auxiliary loop.

Referring now to the auxiliary loop 28 in the data discriminator 13, it is redrawn in FIG. 4 to indicate the network of loop filter 31. As illustrated, the network includes three branches 60, 61 and 62 connected in parallel between phase detector 30 and the VCO 32. Branch 60 contains a capacitance 65 connected in series between terminals 63 and 64; branch 61 has resistance 66 and capacitance 67 connected in series between terminals 63 and 64; and branch 62 has an amplifier 68 connected between those terminals. Considering the loop 28, a Bode diagram of the loop filter 31 is shown in FIG. 5, a Bode diagram of the VCO 32 response is shown in FIG. 6, and the Bode diagram of the complete open loop transfer function $KG(s)$ vs. frequency is shown in FIG. 7, $KG(s)$ being defined as follows:

$$KG(s)=K_1K_2K_3G_1(s)G_2(s) \quad (17)$$

where $K=K_1K_2K_3$,
$G(s)=G_1(s)G_2(s)$,
$K_1$=phase detector constant,
$G_1(s)$=transfer function of the filter 31,
$K_2$=amplifier constant,
$K_3$=VCO constant,
$G_2(s)$=VCO transfer function, and
$s$=arbitrary complex variable.

Considering the loop 28 as a whole, the closed loop frequency to frequency transfer function may be expressed in LaPlace notation as follows: ($C_2$ very much greater than $C_1$), $$\frac{\omega_o(s)}{\omega_i(s)}=\frac{K}{C_1}\cdot\frac{1}{s^2+\frac{1}{R_1C_1}s+\frac{K}{C_1}} \quad (18)$$

where $$\omega_o(s)=2\pi f_x$$

$\omega_i=2\pi f_s$
$K=K_1K_2K_3$
$C_1$=capacitance 65
$R_1$=resistance 66

Note the absence of a zero term in the numerator of Equation 18. Equation 18 may be rewritten as follows:

$$\frac{\omega_o(s)}{\omega_i(s)}=\frac{\omega_n^2}{s^2+2\zeta\omega_n^s+\omega_n^2} \quad (19)$$

$$\omega_n^2=K/C_1$$

where $$\zeta=1/2\omega_nR_1C_1$$

The roots of Equation 19 can be shown to be a pair of complex conjugate poles which lie on a circle of radius $\omega_n$ in the negative half of the complex plane, and at angles $+\phi$ and $-\phi$ from the negative real axis such that $\zeta=\cos\phi$. The normalized delay for $\omega_n=1$ is then approximately $2\zeta$. Further, the delay $\tau_5$ of the loop 28 in simplified form is then as follows:

$$\tau_5\approx\frac{2\zeta}{\omega_n} \quad (20)$$

where $\omega_n$ is the corner frequency of the loop response and $\zeta$ is the damping factor. If $\tau_4$ is the delay encountered by the data in passing through band pass filter 14 in the discriminator 13, then appropriate values of $\omega_n$ and $\zeta$ may be selected to make $\tau_5$ equal to $\tau_4$ in each data discriminator, to implement Case 1 above. Thus, means is provided to control the delay and damping factor for optimal magnitude and time delay.

Figure 8:
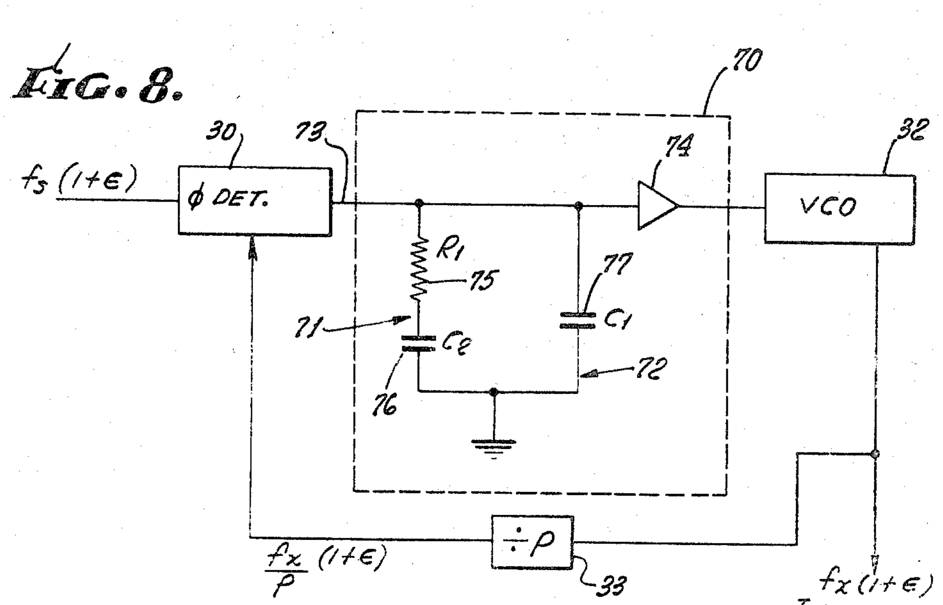
FIG. 8 is a showing like that of FIG. 4, but directed to a modified form of the reference frequency delay loop.

FIG. 8 shows another form of the auxiliary loop discriminator, the difference in the loop filter includes parallel branches 71 and 72 each connected between the phase detector output terminal 73 and the VCO 32. Branch 71 includes resistance 75 and capacitance 76, and branch 72 includes capacitance 77. Amplifier 74 is connected between terminal 73 and the VCO 32.

Phase detectors 24, 30 and 38 and loop filters 25, 31 and 39 may be advantageously mechanized as disclosed in Edward K. Dalton application for U.S. Letters Patent entitled, "FM Discriminator Smoothing Network," Ser. No. 441,183, filed Mar. 19, 1965, now Patent No. 3,399,352.

We claim:

1. In a system for processing a time domain modulated data input signal of frequency $f_d$ recorded with a reference frequency signal characterized in that the signal frequency $f_d$ and a frequency version of the reference signal of frequency $f_x$ vary with record speed variations, data discriminator means response to the $f_d$ and $f_x$ signals to derive an internal signal of frequency $f_v$ tracking $f_d$ and an output voltage $E_v$, said means including a main phase locked loop comprising a phase detector to receive $f_d$ signal, a loop filter connected to receive the phase detector output and a current controlled oscillator connected to receive current $I_v$ from the loop filter and said $f_x$ signal and to produce said $f_v$ signal also applied to said phase detector, $f_v$ varying directly as $I_v$ and $f_x$.

2. The system of claim 1 including means responsive to the recorded reference signal of frequency $f_r$ to supply a preliminary frequency version thereof of frequency $f_s$ to said data discriminator.

3. The system of claim 2 in which said last named means includes a band pass filter and a phase locked loop respectively characterized as providing envelope delays $\tau_1$ and $\tau_2$ for the reference signal frequency version of frequency $f_s$.

4. The system of claim 3 in which the data discriminator includes a band pass filter characterized as providing an envelope delay $\tau_4$ for the data input signal of frequency $f_d$.

5. The system of claim 4 in which the sum $\tau_1+\tau_2$ is substantially equal to $\tau_4$.

6. The system of claim 3 including a delay line electrically connected at the input side of the data discriminator to provide an additional phase delay $\tau_3$ for the data input signal of frequency $f_d$, and further characterized in that the sum $\tau_1+\tau_2$ is substantially equal to $\tau_3$.

7. The system of claim 4 including a delay line electrically connected at the input side of the data discriminator to provide an additional envelope delay $\tau_3$ for the data input signal of frequency $f_d$, and further characterized in that the sum $\tau_1+\tau_2$ is substantially equal to the sum $\tau_3+\tau_4$.

8. The system of claim 7 in which the data discriminator includes an auxiliary phase locked loop through which a frequency version of the reference frequency signal of frequency $f_s$ is supplied to the main phase locked loop.

9. The system of claim 8 in which the auxiliary phase locked loop includes means to convert the reference signal version of frequency $f_s$ to a clock signal of frequency $f_x$, the auxiliary loop providing an envelope delay $\tau_5$ for the clock signal of frequency $f_x$.

10. The system of claim 9 in which the sum $\tau_1+\tau_2+\tau_5$ is substantially equal to the sum $\tau_3+\tau_4$.

11. In a system for processing a time domain modulated data input signal recorded with a reference frequency signal characterized in that the data signal and reference signal are both subject to wow and flutter during recording and playback, a reference channel including a first phase locked loop to convert the reference frequency to a time delayed version $f_s$, and a data discriminator to receive the data signal and to which said version $f_s$ is applied as a control such that the discriminator has an otuput voltage signal that does not vary with said wow and flutter, the data discriminator including a main phase locked loop to receive the data signal, and an auxiliary phase locked loop to receive and convert said version $f_s$ to a further time delayed clock frequency $f_x$ applied as a reference and control to said main phase locked loop, the auxiliary phase locked loop including a phase detector to receive said version $f_s$, a loop filter connected to receive the phase detector output, a voltage controlled oscillator connected to receive the loop filter output, and a frequency divider to receive and divide the oscillator output frequency $f_x$ and to supply said divided frequency to the phase detector.

12. The combination of claim 11 in which the loop filter includes two parallel branches, one containing resistance and capacitance in series and the other containing capacitance only.

13. In a system for processing a frequency modulated data input signal recorded with a reference frequency signal characterized in that the data signal and reference signal are both subject to wow and flutter during recording and playback, a reference channel including a first phase locked loop to convert the reference frequency to a time delayed frequency version $f_s$, and a data discriminator to receive the data signal and to which said frequency version $f_s$ is applied as a control such that the discriminator has an output voltage signal that does not vary with said wow and flutter, the data discriminator including a main phase locked loop to receive and convert said reference frequency version $f_s$ to a further time delayed clock frequency $f_x$ applied as a reference and control to said main phase locked loop, the main phase locked loop including a phase detector to receive the data signal, a loop filter connected to receive the phase detector output, and a current controlled oscillator connected to receive current from the loop filter and said clock frequency $f_x$ as an oscillator control and to produce a feedback signal of frequency $f_v$ tracking the data signal frequency, the discriminator loop output being derived as a voltage $E_v$ from said loop filter.

14. The combination of claim 13 in which $E_v$ is related to $f_v$ and $f_x$ by the equation $$E_v = x - \beta \frac{f_v(1+\phi)}{f_x(1+\phi)}$$

where $x$ and $\beta$ are constants, and $\phi$ is the fractional change in the recording playback speed.

References Cited

UNITED STATES PATENTS

| | | | |
|---|---|---|---|
| 3,181,133 | 4/1965 | Seitner | 340—174.1 |
| 3,017,616 | 1/1962 | Runyan | 340—174.1 |
| 3,253,237 | 5/1966 | Runyan | 179—100.2 |

BERNARD KONICK, Primary Examiner

J. RUSSELL GOUDEAU, Assistant Examiner

U.S. Cl. X.R.

340—174.1